United States Patent
Seo et al.

(10) Patent No.: US 7,796,958 B2
(45) Date of Patent: Sep. 14, 2010

(54) TRANSMITTER AND TRANSMITTING METHOD THEREOF IN WIRELESS COMMUNICATION SYSTEM

(75) Inventors: Hae-Moon Seo, Yongin-si (KR);
Yeon-Kuk Moon, Seoul (KR);
Young-Kuk Park, Yongin-si (KR);
Kwang-Ho Won, Yongin-si (KR);
Seong-Dong Kim, Yongin-si (KR)

(73) Assignee: Korea Electronics Technology Institute (KR)

( * ) Notice: Subject to any disclaimer, the term of this patent is extended or adjusted under 35 U.S.C. 154(b) by 561 days.

(21) Appl. No.: 11/847,763

(22) Filed: Aug. 30, 2007

(65) Prior Publication Data
US 2009/0054013 A1     Feb. 26, 2009

(30) Foreign Application Priority Data
Aug. 24, 2007     (KR) .................... 10-2007-0085349

(51) Int. Cl.
*H04B 1/02* (2006.01)
*H04B 1/04* (2006.01)
*H04L 27/00* (2006.01)

(52) U.S. Cl. .............. 455/91; 455/118; 455/127.4; 375/295; 375/296

(58) Field of Classification Search .......... 455/91, 455/102, 115.1, 101, 120, 127.4, 118; 375/295, 375/297, 298
See application file for complete search history.

(56) References Cited
U.S. PATENT DOCUMENTS

| | | | | |
|---|---|---|---|---|
| 7,010,280 | B1* | 3/2006 | Wilson .................... | 455/126 |
| 7,031,676 | B2* | 4/2006 | Shi ........................ | 455/126 |
| 7,260,157 | B2* | 8/2007 | Hagh et al. ............. | 375/297 |
| 7,469,017 | B2* | 12/2008 | Granstrom et al. ..... | 375/295 |

* cited by examiner

*Primary Examiner*—Sonny Trinh
(74) *Attorney, Agent, or Firm*—Edell, Shapiro & Finnan, LLC

(57) ABSTRACT

A transmitter and a transmitting method of a wireless communication system are provided. The transmitter transmits RF signals using an outphasing scheme of converting one analog IF NC-EMS into two analog C-EMSs. In the transmitter, a baseband processor generates a baseband digital modulated I-signal and a baseband digital modulated Q-signal. A signal converter converts the baseband digital modulated I-signal and the baseband digital modulated Q-signal into a baseband analog modulated I-signal and a baseband analog modulated Q-signal. An IF processor up-converts the baseband analog modulated I-signal and the baseband analog modulated Q-signal to generate one analog IF NC-EMS. A signal component separator separates the analog IF NC-EMS into a first analog IF C-EMS and a second analog IF C-EMS. An RF processor up-converts the first analog IF C-EMS and the second analog IF C-EMS to generate a first analog RF C-EMS and a second analog RF C-EMS. A power amplifier amplifies powers of the first and second analog RF C-EMSs. An RF combiner combines the first and second analog RF C-EMSs having the amplified powers to generate one combined analog RF C-EMS.

11 Claims, 3 Drawing Sheets

TRANSMITTER AND TRANSMITTING METHOD THEREOF IN WIRELESS COMMUNICATION SYSTEM

CROSS-REFERENCE TO RELATED APPLICATIONS

This application claims priority under 35 U.S.C. §119 to Korean Patent Application No. 85349/2007, filed on Aug. 24, 2007 the disclosure of which is incorporated herein by reference in its entirety.

BACKGROUND OF THE INVENTION

1. Field of the Invention

The present disclosure relates to a transmitter and a transmitting method thereof in a wireless communication system, and more particularly, to a transmitter of a wireless communication system, which can transmit radio frequency (RF) signals using an outphasing scheme of converting one analog intermediate frequency non-constant envelope modulated signal (IF NC-EMS) into two analog IF C-EMSs, and a transmitting method thereof.

2. Description of the Related Art

Recently, many studies have been conducted on multi-band and low-power one-chip solutions in wireless communication systems. Because RF transmitters are essential to wireless communication systems, there is an increasing demand for optimization requirement in association with multi-band and low-power one-chip solutions.

A variety of modulation schemes are used in wireless communication systems. As a data rate is increasing, a modulation scheme becomes more complicated. To support a high data rate, most of modulation schemes store information in both amplitude and phase. In this way, such modulation schemes can increase the frequency bandwidth efficiency and the data rate. At this point, the modulated signal is a non-constant envelope modulated signal (NC-EMS). A transmitter that processes an NC-EMS requires a back-off margin of a peak-to-average ratio (PAR) higher than a transmitter that processes a constant envelope modulated signal (C-EMS). Therefore, a power amplifier having a higher linearity is needed, thus increasing the transmission power consumption of the transmitter.

Meanwhile, a super-heterodyne system is widely used as a transmission scheme in wireless communication systems. Examples of the super-heterodyne transmitter include a polar transmitter and a combined analog locked loop universal modulation (CALLUM) transmitter.

FIG. 1 is a block diagram of a conventional polar transmitter.

The conventional polar transmitter of FIG. 1 has difficulty in sorting phases/amplitudes of desired signals because of a frequency-dependant delay between an envelope and a phase. Further, the conventional polar transmitter must overcome a limited frequency response of a DC/DC converter and a limited linearity of an envelope magnitude. Moreover, a general baseband modem cannot form an entire transmission path. Thus, a polar-dedicated baseband modem must be provided for forming the entire transmission path.

FIG. 2 is a block diagram of a conventional CALLUM transmitter.

In the conventional CALLUM transmitter of FIG. 2, errors occurring in a down-conversion again appear in a final output. The hardware architecture of a feedback system is complicated and the competitiveness in high-speed broadband operation is weak.

The conventional transmitters perform a frequency up-conversion using one or more intermediate frequencies and complicated hardware is used in the conventional transmitter, thus increasing power consumption. One of approaches to solving the problems is a direct-conversion architecture that directly perform a frequency up-conversion without IF conversion.

The conventional direct-conversion, however, must generate a quadrature signal in a local oscillator. The phase of an RF signal must be accurately shifted by 90 degrees. Therefore, hardware architecture becomes more complicated and much power is consumed. Moreover, the modulation quality of the transmitter is degraded.

SUMMARY

Therefore, an object of the present invention is to provide a transmitter of a wireless communication system, which can transmit RF signals using an outphasing scheme of converting one analog IF NC-EMS into two analog IF C-EMSs, and a transmitting method thereof.

Another object of the present invention is to provide a transmitter of a wireless communication system, which can perform a high-efficiency low-power RF nonlinear amplification by transmitting RF signals using an outphasing scheme, and a transmitting method thereof.

A further object of the present invention is to provide a transmitter of a wireless communication system, which can reduce power consumption and inter-channel interference by performing a high-efficiency low-power RF nonlinear amplification, upon transmission of RF signals using an outphasing scheme, and a transmitting method thereof.

A further object of the present invention is to provide a transmitter of a wireless communication system, which can improve high-linearity and low-power characteristics and simplify hardware architecture by using a dual phase looked loop and a nonlinear power amplifier, upon transmission of RF signals using an outphasing scheme, and a transmitting method thereof.

To achieve these and other advantages and in accordance with the purpose(s) of the present invention as embodied and broadly described herein, a transmitter of a wireless communication system in accordance with an aspect of the present invention comprises: a baseband processor configured to generate a baseband digital modulated I-signal and a baseband digital modulated Q-signal; a signal converter configured to convert the baseband digital modulated I-signal and the baseband digital modulated Q-signal into a baseband analog modulated I-signal and a baseband analog modulated Q-signal; an IF processor configured to up-convert the baseband analog modulated I-signal and the baseband analog modulated Q-signal to generate one analog IF NC-EMS; a signal component separator configured to separate the analog IF NC-EMS into a first analog IF C-EMS and a second analog IF C-EMS; an RF processor configured to up-convert the first analog IF C-EMS and the second analog IF C-EMS to generate a first analog RF C-EMS and a second analog RF C-EMS; a power amplifier configured to amplify powers of the first and second analog RF C-EMSs; and an RF combiner configured to combine the first and second analog RF C-EMSs having the amplified powers to generate one combined analog RF C-EMS.

The transmitter further comprise a low pass filter configured to filter the analog IF NC-EMS output from the IF processor to thereby remove harmonics signals.

To achieve these and other advantages and in accordance with the purpose(s) of the present invention, a transmitting method of a wireless communication system in accordance with another aspect of the present invention comprises: generating a baseband digital modulated I-signal and a baseband digital modulated Q-signal; converting the baseband digital modulated I-signal and the baseband digital modulated Q-signal into a baseband analog modulated I-signal and a baseband analog modulated Q-signal, respectively; up-converting the baseband analog modulated I-signal and the baseband analog modulated Q-signal to generate one analog IF NC-EMS; separating the analog IF NC-EMS into a first analog IF C-EMS and a second analog IF C-EMS; up-converting the first analog IF C-EMS and the second analog IF C-EMS to generate a first analog RF C-EMS and a second analog RF C-EMS; amplifying powers of the first and second analog RF C-EMSs; and combining the first and second analog RF C-EMSs having the amplified powers to generate one combined analog RF C-EMS.

The transmitting method may further comprise filtering the analog IF NC-EMS to thereby remove harmonics signals.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings.

Figure 1:
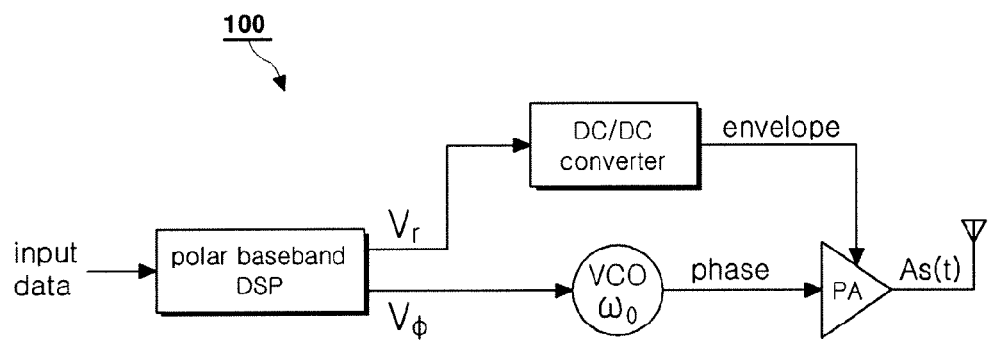
FIG. 1 is a block diagram of a conventional polar transmitter.
Figure 2:
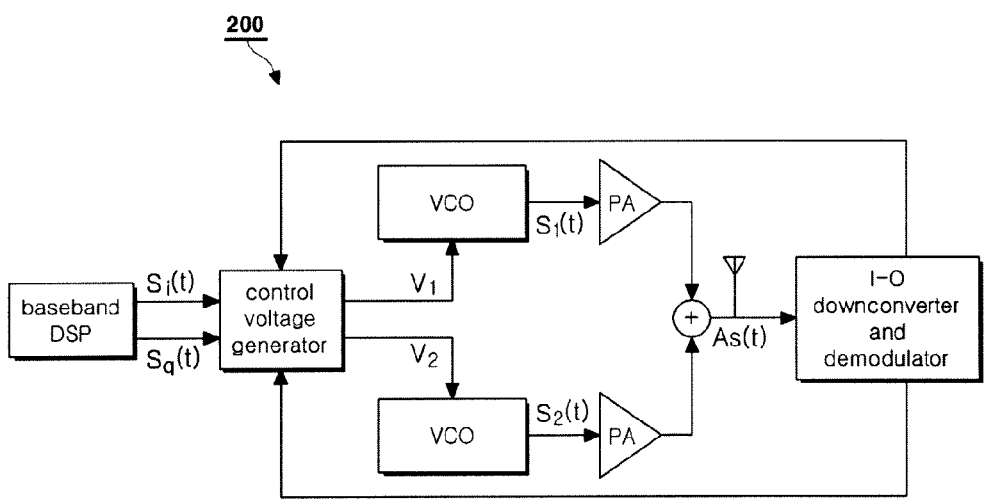
FIG. 2 is a block diagram of a conventional CALLUM transmitter.
Figure 3:
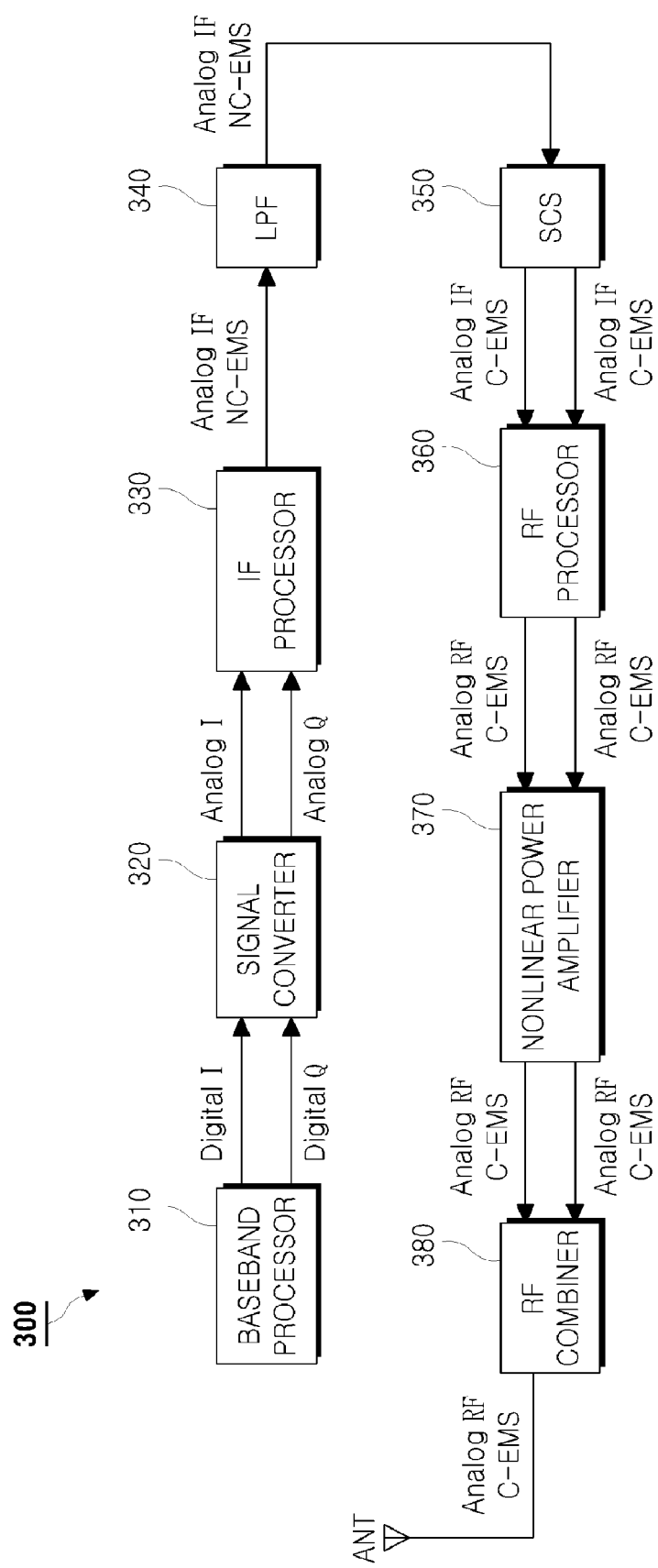
FIG. 3 is a block diagram of a transmitter of a wireless communication system according to an embodiment of the present invention.

FIG. 3 is a block diagram of a transmitter of a wireless communication system according to an embodiment of the present invention.

Referring to FIG. 3, the transmitter 300 includes a baseband processor 310, a signal converter 320, an IF processor 330, a low pass filter (LPF) 340, a signal component separator (SCS) 350, an RF processor 360, a nonlinear power amplifier 370, and an RF combiner 380. The baseband processor 310 generates a baseband digital modulated I-signal and a baseband digital modulated Q-signal. The signal converter 320 separates the baseband digital modulated I-signal and the baseband digital modulated Q-signal into a baseband analog modulated I-signal and a baseband analog modulated Q-signal. The IF processor 330 generates one analog IF NC-EMS using the baseband analog modulated I-signal and the baseband analog modulated Q-signal. The LPF 340 low-pass-filters the analog IF NC-EMS. The signal component separator 350 separates the low-pass-filtered analog IF NC-EMS into two analog IF C-EMSs. The RF processor 360 converts the two analog IF C-EMSs into two analog RF C-EMSs. The nonlinear power amplifier 370 nonlinearly amplifies powers of the two analog RF C-EMSs. The RF combiner 380 combines the two analog RF C-EMSs having the nonlinearly amplified powers to generate one combined analog RF C-EMS.

More specifically, the baseband processor 310 generates the baseband digital modulated I-signal and the baseband digital modulated Q-signal to the signal converter 320.

The signal converter 320 converts the baseband digital modulated I-signal from the baseband processor 310 into the analog modulated I-signal and converts the baseband digital modulated Q-signal from the baseband processor 310 into the analog modulated Q-signal, and outputs the analog modulated I-signal and the analog modulated Q-signal to the IF processor 330. The signal converter 320 has an LPF function of filtering the analog modulated I-signal and the analog modulated Q-signal to thereby pass only the low frequency band signals.

The IF processor 330 up-converts the baseband analog modulated I-signal from the signal converter 320 to generate the IF analog modulated I-signal and up-converts the baseband analog modulated Q-signal from the signal converter 320 to generate the IF analog modulated Q-signal, and mixes the IF analog modulated I-signal and the IF analog modulated Q-signal to output the analog IF NC-EMS to the LPF 340.

The LPF 340 removes unwanted harmonics signals by filtering the analog NC-EMS output from the IF processor 330. Although the LPF 340 is separately provided in this embodiment, the transmitter 300 may not include the LPF 340.

The signal component separator 350 separates the analog IF NC-EMS output from the LPF 340 into the two analog IF C-EMSs using Equations (1) and (2) below:

$$NC\_EMS(t) = [NC\_EMS_i(t) + jNC\_EMS_q(t)] \times \text{Exp}(j[\omega_0 t]) \quad (1)$$
$$= R(t) \times \text{Exp}(j[\omega_0 t + \phi(t)])$$

where $$R(t) = (NC\_EMS_i^2(t) + NC\_EMS_q^2(t))^{0.5}, \text{ and}$$
$$\phi(t) = \tan^{-1}(NC\_EMS_q(t)/NC\_EMS_i(t))$$

$$NC\_EMS(t) = C\_EMS_1(t) + C\_EMS_2(t) \quad (2)$$

where
$$C\_EMS_1(t) = 0.5 R_{max} \times \text{Exp}(j[\omega_0 t + \phi(t) + \theta(t)]),$$
$$C\_EMS_2(t) = 0.5 R_{max} \times \text{Exp}(j[\omega_0 t + \phi(t) - \theta(t)]),$$
$$\theta(t) = \cos^{-1}[R(t)/R_{max}],$$

$R_{mzs}$ represents the maximum value of NC_EMS(t),

NC_EMS(t) represents the analog IF NC-EMS, $C\_EMS_1(t)$ represents the analog IF C-EMS, and Exp represents an exponential function.

In this way, the transmitter uses an outphasing scheme to convert one analog IF NC-EMS into two analog IF C-EMSs and uses the nonlinear power amplifier to perform a high-efficiency and low-power RF nonlinear amplification. Hence, power consumption of the transmitter can be reduced and inter-channel interference can be suppressed.

The RF processor 360 up-converts the first analog IF C-EMS into the first analog RF C-EMS and up-converts the second analog IF C-EMS into the second analog RF C-EMS.

The nonlinear power amplifier 370 nonlinearly amplifies the powers of the two up-converted analog RF C-EMSs and outputs the nonlinearly amplified analog RF C-EMSs to the RF combiner 380.

The RF combiner 380 combines the two analog RF C-EMSs having the nonlinearly amplified powers and transmits the combined analog RF C-EMS through an antenna to the outside.

Figure 4:
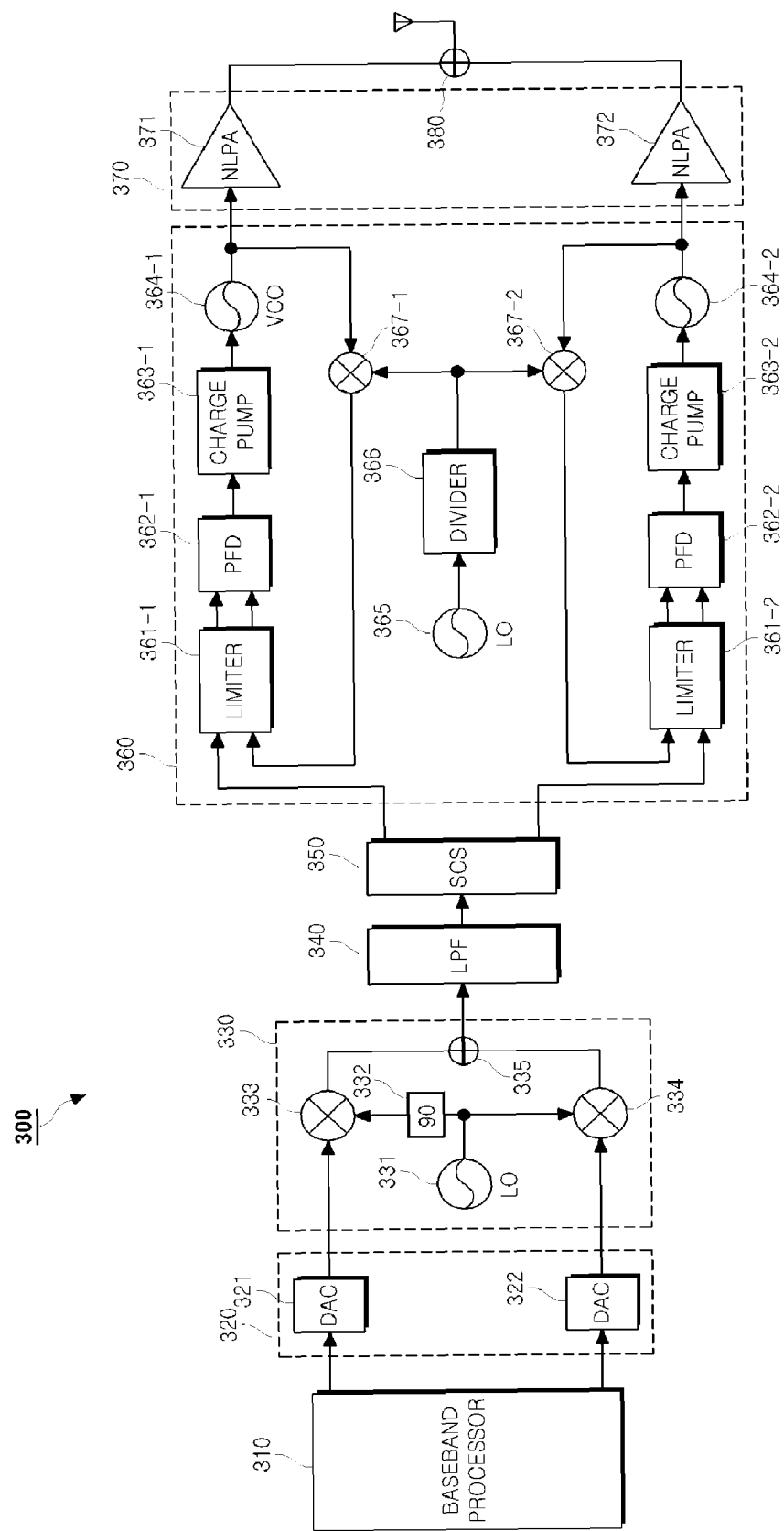
FIG. 4 is a detailed block of the transmitter illustrated in FIG. 3.

FIG. 4 is a detailed block diagram of the transmitter 300 illustrated in FIG. 3.

Referring to FIG. 4, the signal converter 320 includes two digital-to-analog converters (DACs) 321 and 322.

The DAC 321 converts the baseband digital modulated I-signal output from the baseband processor 310 into the analog modulated I-signal and outputs the analog modulated I-signal to the IF processor 330. The DAC 321 has an LPF function of filtering the analog modulated I-signal to thereby pass only the low frequency band signal.

The DAC 322 converts the baseband digital modulated Q-signal output from the baseband processor 310 into the analog modulated Q-signal and outputs the analog modulated Q-signal to the IF processor 330. The DAC 322 has an LPF function of filtering the analog modulated Q-signal to thereby pass only the low frequency band signal.

The IF processor 330 includes a local oscillator 331, a phase shifter 332, two mixers 333 and 334, and an IF combiner 335.

The local oscillator 331 generates a local frequency signal to the two mixers 333 and 334. Although the IF processor 330 includes the local oscillator 331 in this embodiment, the present invention is not limited thereto. For example, the baseband processor 310 can be configured to generate the local frequency signal.

The phase shifter 332 shifts the phase of the local frequency signal generated from the local oscillator 331 by 90 degrees and outputs the 90-degree phase-shifted local frequency signal to the mixer 333.

The mixer 333 mixes the 90-degree phase-shifted local frequency signal from the phase shifter 332 with the baseband analog modulated I-signal from the DAC 321 and outputs the IF analog modulated I-signal to the IF combiner 335.

The mixer 334 mixes the local frequency signal from the local oscillator 331 with the baseband analog modulated Q-signal from the DAC 322 and outputs the IF analog modulated Q-signal to the IF combiner 335.

The IF combiner 335 combines the IF analog modulated I-signal from the mixer 333 and the IF analog modulated Q-signal from the mixer 334 and outputs the analog IF NC-EMS to the LPF 340. Because the 90-degree phase-shifted local frequency signal is input to the mixer 333, the IF analog modulated I-signal and the IF analog modulated Q-signal input to the IF combiner 335 are orthogonal to each other.

The RF processor 360 includes limiters (LM) 361-1 and 361-2, phase frequency detectors (PFD) 362-1 and 362-2, charge pumps (CP) 363-1 and 363-2, voltage controlled oscillators (VCO) 364-1 and 364-2, a local oscillator (LO) 365, a divider 366, and mixers 367-1 and 367-2.

The limiter 361-1 compares the first analog IF C-EMS separated by the signal component separator 350 with an analog IF signal fed back from the mixer 367-1 and limits the amplitude of the first analog IF C-EMS. That is, the limiter 361-1 saturates the high level and the low level of the first analog IF C-EMS separated by the signal component separator 350 according to the analog IF signal fed back from the mixer 367-1.

The phase frequency detector 362-1 detects the phase/frequency of the first analog IF C-EMS having the limited amplitude and outputs the detected phase/frequency to the charge pump 363-1.

The charge pump 363-1 pumps charges of the first analog IF C-EMS according to the detected phase/frequency. The charge pump 363-1 has a loop filter function of generating a DC voltage V1 proportional to the first analog RF C-EMS having the pumped charges.

The voltage controlled oscillator 364-1 generates the first analog RF C-EMS proportional to the DC voltage V1 output from the charge pump 363-1. In practice, the voltage controlled oscillator 364-1 generates the first analog RF C-EMS by up-converting the first analog IF C-EMS.

The limiter 361-2 compares the second analog IF C-EMS separated by the signal component separator 350 with an analog IF signal fed back from the mixer 367-2 and limits the amplitude of the second analog IF C-EMS. That is, the limiter 361-2 saturates the high level and the low level of the second analog IF C-EMS separated by the signal component separator 350 according to the analog IF signal fed back from the mixer 367-2.

The phase frequency detector 362-2 detects the phase/frequency of the second analog IF C-EMS having the limited amplitude and outputs the detected phase/frequency to the charge pump 363-2.

The charge pump 362-2 pumps charges of the second analog IF C-EMS according to the detected phase/frequency. The charge pump 363-2 has a loop filter function of a DC voltage V2 proportional to the second analog RF C-EMS having the pumped charges.

The voltage controlled oscillator 364-2 generates the second analog RF C-EMS proportional to the DC voltage V2 output from the charge pump 363-2. In practice, the voltage controlled oscillator 364-2 generates the second analog RF C-EMS by up-converting the second analog IF C-EMS.

The local oscillator 365 generates a local frequency signal to the divider 366. Although the local oscillator for generating the local frequency signal used for the IF conversion and the local oscillator for generating the local frequency signal used for the RF conversion are separately implemented, only one local oscillator can be commonly used.

The divider 366 divides the local frequency signal generated from the local oscillator 365 and outputs the divided local frequency signal to the mixers 367-1 and 367-2.

The mixer 367-1 mixes the first analog RF C-EMS from the voltage controlled oscillator 364-1 with the divided local frequency signal from the divider 366 and feeds back the analog IF signal to the limiter 361-1. That is, the mixer 367-1 down-converts the first analog RF C-EMS from the voltage controlled oscillator 364-1 into the analog IF signal.

The mixer 367-2 mixes the second analog RF C-EMS from the voltage controlled oscillator 364-2 with the divided local frequency signal from the divider 366 and feeds back the analog IF signal to the limiter 361-2. That is, the mixer 367-2 down-converts the second analog RF C-EMS from the voltage controlled oscillator 364-2 into the analog IF signal.

The limiter 361-1, the phase frequency detector 362-1, the charge pump 363-1, the voltage controlled oscillator 364-1, and the mixer 367-1 constitutes a first phase locked loop (PLL), and the limiter 361-2, the phase frequency detector 362-2, the charge pump 363-2, the voltage controlled oscillator 364-2, and the mixer 367-2 constitutes a second PLL. That is, a dual PLL is used to convert the two digital IF C-EMSs into the two analog RF C-EMSs, and the phases of the signals to be up-converted are modulated.

The nonlinear power amplifier 370 includes a first nonlinear power amplifier 371 and a second nonlinear power amplifier 372.

The first nonlinear power amplifier 371 nonlinearly amplifies the power of the first analog RF C-EMS up-converted by the voltage controlled oscillator 364-1 and outputs the first analog RF C-EMS having the nonlinearly amplified power to the RF combiner 380.

The second nonlinear power amplifier 372 nonlinearly amplifies the power of the second analog RF C-EMS up-converted by the voltage controlled oscillator 364-2 and outputs the second analog RF C-EMS having the nonlinearly amplified power to the RF combiner 380.

Because the first and second nonlinear power amplifiers 371 and 372 have the high-efficiency and low-power characteristics, they perform the high-efficiency and low-power RF nonlinear amplification.

The RF combiner 380 combines the two nonlinearly low-power-amplified analog RF C-EMSs into one analog RF C-EMS.

Upon transmission of the RF signal using the outphasing scheme, the use of the dual PLL and the nonlinear power amplifiers can enhance the high-linearity and low-power characteristics and simplify the hardware architecture of the transmitter.

According to the embodiments of the present invention, the transmitter can perform the high-efficiency low-power RF nonlinear amplification by transmitting RF signals using the outphasing scheme.

Further, the transmitter can reduce power consumption and inter-channel interference by performing the high-efficiency low-power RF nonlinear amplification, upon transmission of RF signals using the outphasing scheme.

Furthermore, the transmitter can improve high-linearity and low-power characteristics and simplify hardware architecture by using the dual PLL and the nonlinear power amplifier, upon transmission of RF signals using the outphasing scheme.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A transmitter of a wireless communication system, comprising:
a baseband processor configured to generate a baseband digital modulated I-signal and a baseband digital modulated Q-signal;
a signal converter configured to convert the baseband digital modulated I-signal and the baseband digital modulated Q-signal into a baseband analog modulated I-signal and a baseband analog modulated Q-signal;
an intermediate frequency (IF) processor configured to up-convert the baseband analog modulated I-signal and the baseband analog modulated Q-signal to generate one analog IF non-constant envelope modulated signal (NC-EMS);
a signal component separator configured to separate the analog IF NC-EMS into a first analog IF C-EMS and a second analog IF C-EMS;
a radio frequency (RF) processor configured to up-convert the first analog IF C-EMS and the second analog IF C-EMS to generate a first analog RF C-EMS and a second analog RF C-EMS;
a power amplifier configured to amplify powers of the first and second analog RF C-EMSs; and
an RF combiner configured to combine the first and second analog RF C-EMSs having the amplified powers to generate one combined analog RF C-EMS.

2. The transmitter of claim 1, wherein the signal converter comprises:
a first digital-to-analog converter configured to convert the baseband digital modulated I-signal into the baseband analog modulated I-signal; and
a second digital-to-analog converter configured to convert the baseband digital modulated Q-signal into the baseband analog modulated Q-signal.

3. The transmitter of claim 2, wherein the first digital-to-analog converter has a low pass filter (LPF) function of low-pass-filtering the baseband analog modulated I-signal.

4. The transmitter of claim 2, wherein the second digital-to-analog converter has a low pass filter (LPF) function of low-pass-filtering the baseband analog modulated Q-signal.

5. The transmitter of claim 1, wherein the signal component separator separates the analog IF NC-EMS into the first analog IF C-EMS and the second analog IF C-EMS using Equations below:

$$NC\_EMS(t) = [NC\_EMS_i(t) + jNC\_EMS_q(t)] \times \mathrm{Exp}(j[\omega_0 t]) \quad (1)$$
$$= R(t) \times \mathrm{Exp}(j[\omega_0 t + \phi(t)])$$
where
$$R(t) = (NC\_EMS_i^2(t) + NC\_EMS_q^2(t))^{0.5}, \text{ and}$$
$$\phi(t) = \tan^{-1}(NC\_EMS_q(t)/NC\_EMS_i(t)).$$

$$NC\_EMS(t) = C\_EMS_1(t) + C\_EMS_2(t) \quad (2)$$
where
$$C\_EMS_1(t) = 0.5 R_{max} \times \mathrm{Exp}(j[\omega_0 t + \phi(t) + \theta(t)]),$$
$$C\_EMS_2(t) = 0.5 R_{max} \times \mathrm{Exp}(j[\omega_0 t + \phi(t) - \theta(t)]),$$
$$\theta(t) = \cos^{-1}[R(t)/R_{max}],$$

$R_{mzs}$ represents the maximum value of NC_EMS(t),
NC_EMS(t) represents the analog IF NC-EMS,
C_EMS, (t) represents the analog IF C-EMS, and
Exp represents an exponential function.

6. The transmitter of claim 1, wherein the power amplifier comprises:
a first nonlinear power amplifier configured to nonlinearly amplify the power of the first analog RF C-EMS; and
a second nonlinear power amplifier configured to nonlinearly amplify the power of the second analog RF C-EMS.

7. The transmitter of any one of claims 1 to 6, further comprising a low pass filter configured to low-pass-filter the analog IF NC-EMS output from the IF processor to thereby remove harmonics signals.

8. A transmitting method of a wireless communication system, comprising:
generating a baseband digital modulated I-signal and a baseband digital modulated Q-signal;
converting the baseband digital modulated I-signal and the baseband digital modulated Q-signal into a baseband analog modulated I-signal and a baseband analog modulated Q-signal, respectively;
up-converting the baseband analog modulated I-signal and the baseband analog modulated Q-signal to generate one analog IF non-constant envelope modulated signal (NC-EMS);
separating the analog IF NC-EMS into a first analog IF C-EMS and a second analog IF C-EMS;

up-converting the first analog IF C-EMS and the second analog IF C-EMS to generate a first analog RF C-EMS and a second analog RF C-EMS;

amplifying powers of the first and second analog RF C-EMSs; and combining the first and second analog RF C-EMSs having the amplified powers to generate one combined analog RF C-EMS.

9. The transmitting method of claim 8, wherein the converting of the baseband digital modulated I-signal and the baseband digital modulated Q-signal comprises low-pass-filtering the analog modulated I-signal and the analog modulated Q-signal, whereby only the low frequency band signals are passed.

10. The transmitting method of claim 8, wherein the powers of the first and second analog RF C-EMSs are nonlinearly amplified.

11. The transmitting method of any one of claims 8 through 10, further comprising filtering the combined analog IF NC-EMS to thereby remove harmonics signals.

* * * * *